United States Patent

De Coene

[15] 3,648,709
[45] Mar. 14, 1972

[54] FEEDER DEVICE FOR COMBINE HARVESTERS

[72] Inventor: Frans J. De Coene, Zedelgem, Belgium
[73] Assignee: Clayson N.V., Zedelgem, Belgium
[22] Filed: July 29, 1970
[21] Appl. No.: 59,263

[30] Foreign Application Priority Data
July 30, 1969 Belgium....................................49,353
July 6, 1970 Belgium....................................50,281

[52] U.S. Cl.........................................................130/27 JT
[51] Int. Cl. ..........................................................A01f 12/26
[58] Field of Search..............................130/27 R, 27 JT, 27 S

[56] References Cited

UNITED STATES PATENTS 2,528,232 10/1950 Krause................................130/27 JT
2,959,175 11/1960 Oberholtz et al. ..................130/27 JT Primary Examiner—Antonio F. Guida
Attorney—Joseph A. Brown, John C. Thompson, James J. Kennedy and George C. Bower

[57] ABSTRACT

An improved feeder device for combine-harvesters of the type having a header and a straw-elevator for harvesting and conveying the harvested crops to crop handling components such as threshing and separating devices. A guide plate is provided between the discharge end of the straw-elevator and the intake portion of the threshing equipment for guiding the crop material from the straw-elevator to the threshing equipment; said guide plate being hinged to a fixed portion of the machine and supported by supporting means, which themselves are kinematically interconnected, so that, on the entrance of a stone or other foreign object towards the threshing equipment, said supporting means are automatically and simultaneously displaced by the stone or other foreign object beating on said plate so as to enable the guide plate to hinge to a position whereby a stone retarder or stone trap is formed.

10 Claims, 12 Drawing Figures

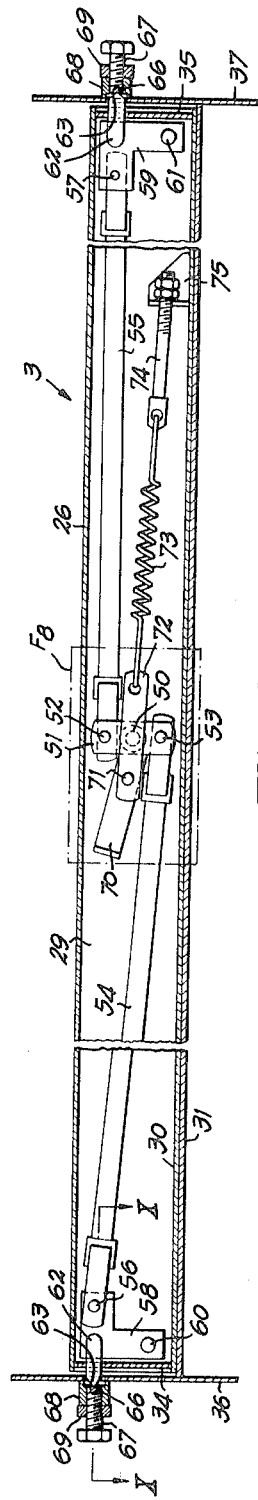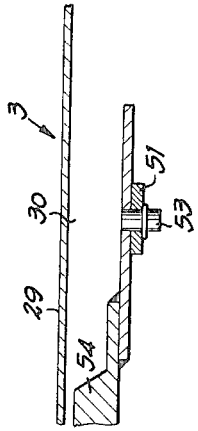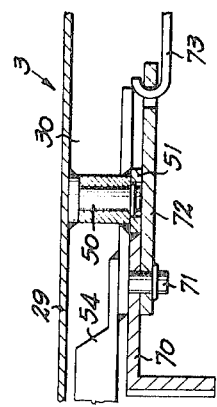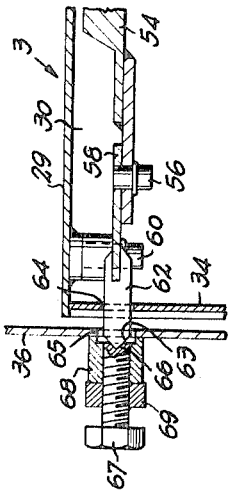

FEEDER DEVICE FOR COMBINE HARVESTERS

FIELD OF THE INVENTION

The invention relates to the field of agricultural machines, more especially crop handling machines such as combine-harvesters having a frame work for supporting the crop handling components and being supported by two front drive wheels and two rear steering wheels, if these machines are of the self-propelled type, or two supporting wheels if these machines are of the pull-type.

DESCRIPTION OF THE PRIOR ART

Combines generally have a header and a straw-elevator in front for harvesting crops and conveying said crops rearwardly to the crop handling devices. Said crop handling devices mainly comprise a threshing cylinder and a threshing concave for threshing the crop material, a separator device for separating the remainder of grains from the crop material and cleaning devices for cleaning the threshed and separated grain.

It is known in the art that it is necessary in most cases to protect the threshing mechanism against the entrance of stones and other foreign objects which can be conveyed together with the crop towards the threshing mechanism, because these stones and the like can seriously damage this threshing mechanism when they interfere with the cylinder and concave.

In order to prevent this, a so called stone trap is applied, as it is known in the art, between the discharge end of the straw-elevator and the input side of the threshing equipment. This stone trap gathers the stones and other foreign objects before they are supplied to the threshing equipment, so that they cannot cause any damage to the threshing equipment.

However the application of such a stone trap has the great disadvantage that the supply of the crop towards the threshing mechanism is braked so that the total capacity of the combine harvester is unfavorably influenced.

It is also known that the present evolution in combine construction mainly consists in the fact that one wants to continuously increase the capacity of the combine by trying to obtain the maximum output of the construction without modifying the generally known basic principles of the combine.

Attempts have already been made for omitting the above described disadvantage so as to increase the total capacity of the combine. However these attempts have not been successful as still other disadvantages originated in the proposed constructions.

A first attempt was made by providing a concave of which the front part, in case it is necessary, can be replaced by a stone trap, by which such a mechanism is provided either with a stone trap and a short concave, or with a normal concave without a stone trap. This execution however, has still the same disadvantage when the stone trap is used because the aforesaid discontinuity remains between the straw-elevator discharge end and the concave.

Another attempt resides in the construction of a concave in such a manner that, when a stone or the like is conveyed onto the concave, the concave is completely or partly turned away in order to allow the stone or the like to fall down. The disadvantage of this is, however, that, once the concave is turned, harvesting is no longer possible as the crop is also discharged out of the threshing equipment without being threshed. It is therefore necessary to stop the machine each time a stone or the like has been conveyed onto the concave replace to the concave into its threshing position. Further, such a construction is rather complicated, as such a concave is normally adjustably in height for adapting the threshing equipment to the kind of crops to be threshed.

Another attempt has been made by providing a hinged plate between the straw-elevator discharge end and the threshing equipment. Said plate is held in a guiding position by resilient means such as springs. When a stone is supplied said plate is hinged downwardly to discharge the stone and is immediately brought back to its guiding position under influence of said springs. This execution has however the disadvantage that the guiding plate is not positively supported and thus will start to vibrate under influence of the continuously changing load of crops being guided over this plate. As this plate is vibrating straw will be sticked between the vibrating portion and the neighboring fixed portion, which is normally the front edge of the concave. This will after a certain time result in a clogging of material and a blocking of the threshing drum.

Moreover the stones which are discharged in this way are accompanied by unthreshed crop material. If all this is supplied to the grain pan, then the cleaning device will become overloaded. If all this is discharged to the ground then unthreshed material is lost.

Another attempt has been made by providing a hinged guiding plate to the discharge end of the straw-elevator, which is positively supported in its guiding position by latch means which are under influence of springs and which hold said means in their latching position and which are displaced opposite to the spring force on the entrance of a stone.

This execution has the disadvantage, that, when a stone is supplied towards the threshing device close to one side of said guiding plate, only the latch located underneath this side is displaced, while the other one remains in its latching position. This results in a deformation of the guide plate which gets jammed between the side walls of the machine, while the stone is still supplied to the threshing equipment.

SUMMARY OF THE INVENTION

The present invention resides in an improved feeder mechanism for combine-harvesters so as to obtain the maximum output of the combine construction by using a positively supported guiding element in front of the threshing equipment so as to avoid any discontinuity in the crop supply and which plate is automatically hinged away when a stone is supplied towards the threshing equipment for preventing the stone from entering the threshing equipment and having none of the disadvantages of the known systems. The improved feeder device mainly comprises for these purposes a hinged guiding plate provided in front of the threshing equipment and being positively supported by supporting members, which themselves are kinematically interconnected so as to be simultaneously displaced when a stone is supplied towards the threshing equipment. This simultaneous displacement of the supporting members enables the guide plate to immediately hinge downwards so as to form or open a conventional stone trap which automatically gathers the stones.

The latching mechanism may further include a mechanism which positively assists the latching of the guiding element under normal conditions and positively assists the unlocking when a stone is encountered.

Other objects and advantages will appear from the following description of two examples of the invention, when considered in connection with the accompanying drawings, and the novel features will be particularly pointed out in the appended claims:

In the Drawings:

FIG. 7 is a cross-sectional view taken on the line VII—VII in FIG. 5.

FIG. 10 is a sectional view on a larger scale taken on the line X—X in FIG. 7.

FIGS. 11 and 12 are sectional views taken on lines XI—XI and XII—XII in FIG. 8.

DESCRIPTION OF THE EMBODIMENT IN FIGS. 1-3

Figure 1:
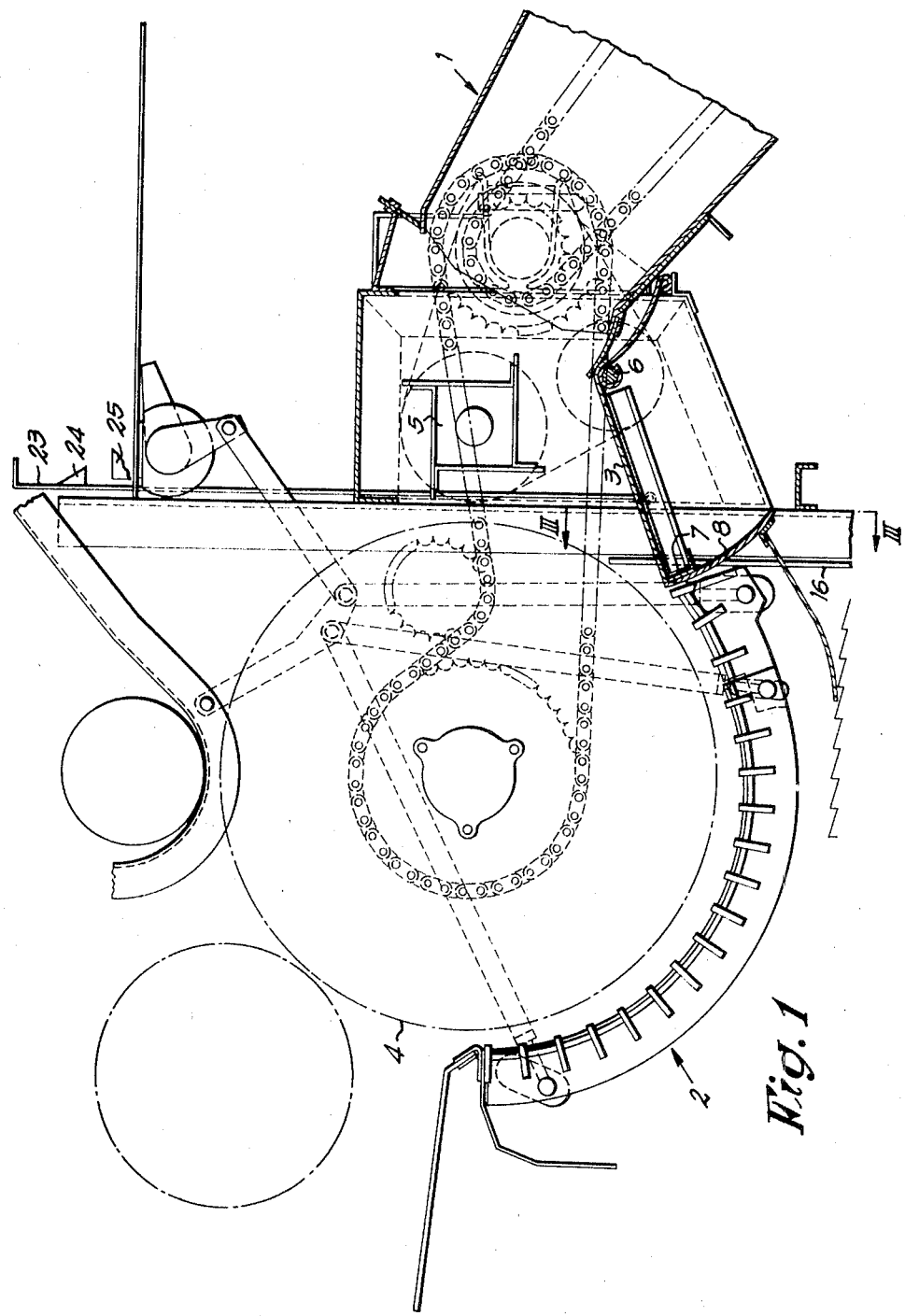
FIG. 1 is a schematic longitudinal-sectional view of the threshing mechanism of a combine harvester together with the parts thereof, which directly cooperate with said threshing mechanism.
Figure 2:
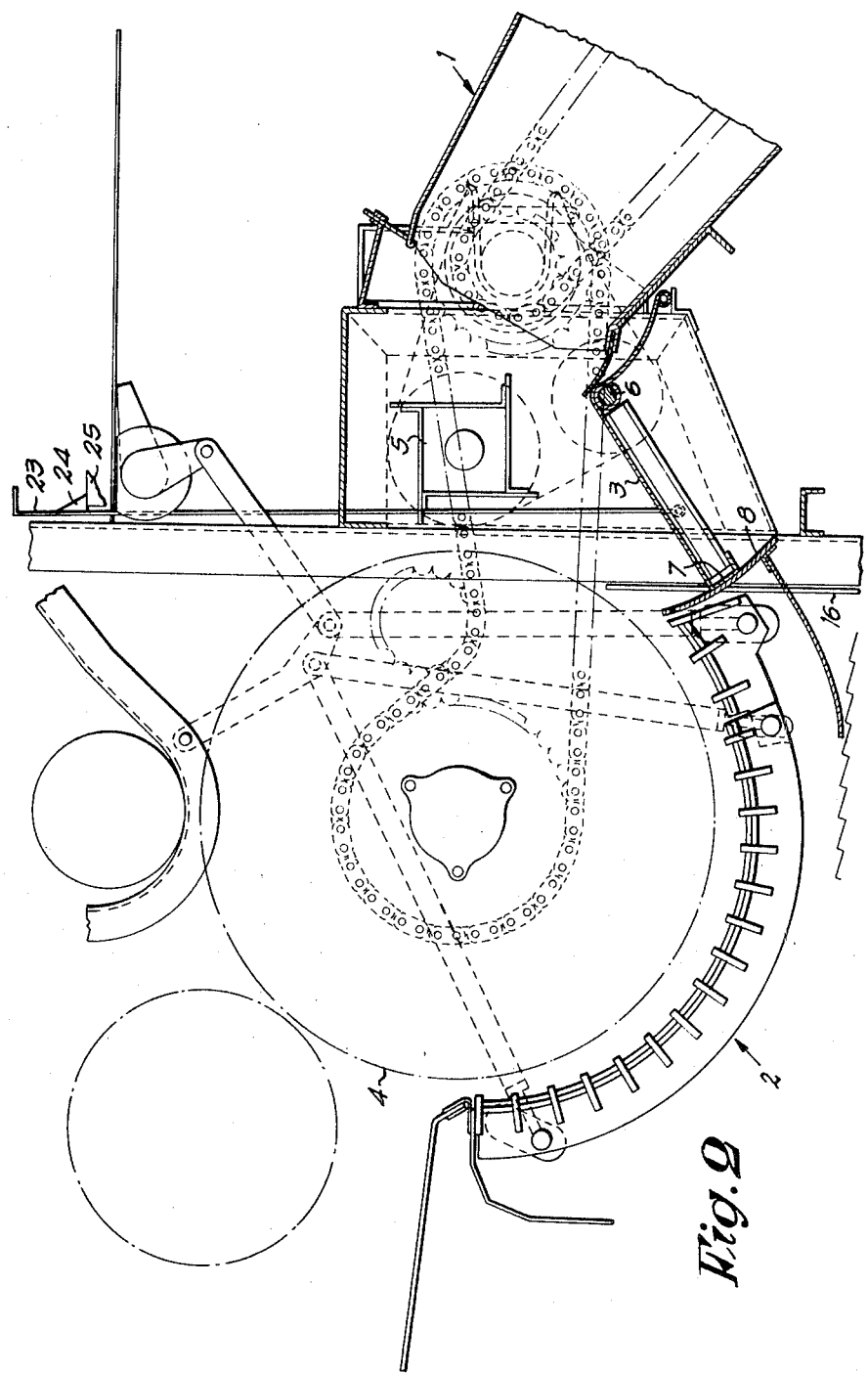
FIG. 2 is a view similar to this of FIG. 1 but with the subject of the invention in another characteristic position.
Figure 3:
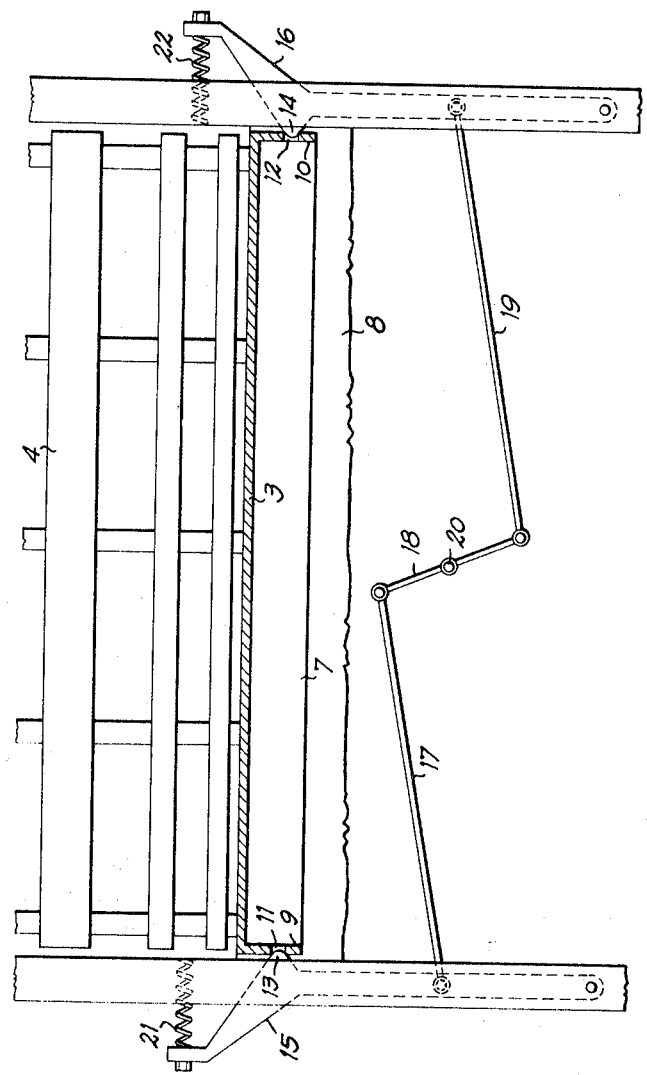
FIG. 3 is a schematical cross sectional view taken on the line III—III of FIG. 1.

In FIGS. 1 to 3, a guide plate 3 is installed according to the invention between the straw elevator 1 and the concave 2, while a beater 5 is mounted above the guide plate 3 and between the elevator 1 and the cylinder 4, the beater facilitating the movement of crop material from the elevator toward the cylinder.

The guide plate 3 is hinged at one longitudinal side around the shaft 6 and is preferably provided at the other longitudinal side with a flange 7 which is applied against a plate 8 having a cylindrical surface the center line of which is situated in the axis or center line of the aforesaid shaft 6.

The extreme ends of this guide plate 3 are also provided with flanges, respectively 9 and 10 in which holes are applied according to the present execution, respectively 11 and 12.

The plate 3 is suspended on triangular or round extensions 13, 14 of levers 15, 16, the extensions projecting into holes 11, 12. These pivoting levers 15 and 16 are kinematically connected with each other, via rods, respectively 17, 18 and 19 by which rod 18 is hinged on a fixed shaft 20. Each pivoting lever 15 and 16 is connected by a tension spring, respectively 21 and 22, with a fixed part of the machine, the springs pulling the extensions 13 and 14 towards the holes 11, 12.

The guide plate 3 is preferably connected with a rod 23 which extends to the driver's seat with its other extreme end. A bracket 24 is fixed on rod 23 and cooperates with a stop block 25 which is schematically edge This rod 23 preferably passes through an unshown opening or groove which is in the steering platform. In the normal threshing position the abutment or bracket 24 on rod 23 is disposed above stop block 25 in the manner shown in FIG. 1. When a stone forces the plate 3 down to the position shown in FIG. 2 the bracket 24 will contact 25. To clear stones from the trap the rod 23 is turned in such a manner that bracket 24 can pass below stop 25, and the rod 23 is then pushed downwardly to swing the rear wdge of plate 3 below the bottom of plate 8 thereby forming an opening through which any trapped stone may pass.

DESCRIPTION OF THE EMBODIMENT IN FIGS. 4-12

In the execution corresponding to FIG. 4 to 12 a modification is shown, which also includes a guide plate, which when a stone or other hard object is fed to the threshing equipment, automatically and completely hinges to a stone trap position and by which said guide plate is also hinged and supported at two points, which, at the moment a stone or such like is supplied, simultaneously are displaced, independently from the place where the stone hits the guide plate.

In this execution the mentioned supports are interconnected via an equipment which normally ensures the latching of the guide plate and which also, when a stone or the like is supplied, assists the unlocking of the guide plate.

Also with this execution it is possible to continue to harvest when the guide plate is hinged downwards as at this moment a conventional stone trap is formed.

This execution has, apart from the advantages of the execution as described above, still a further advantage which resides in the fact that the unlocking is controlled.

The guide plate 3 of this execution mainly comprises a proper guiding surface 26 which is hinged at the input side to a fixed guide plate 27 and which is at the discharge side of the crop proximate to the front edge of the threshing concave 2. Plate 26 is hinged to shaft 28 on the one side and is provided with a rear wall 29 on the other side which is parallel to the neighboring front edge of the concave 2.

The rear wall 29 is further provided with a flange 30 under which a seal 31 is provided by means of a holddown strip 32 and bolts or the like 33.

Triangular plates respectively 34 and 35 are provided to the side-ends of the equipment 3, and fixed to the plate 26, 29 and 30.

The fixed guide plate 27 is at each side-edge secured to the side walls 36-37 of the framework which also support the beater 5 and is also provided with an extension 38 extending above the elevator-housing 1, said elevator-housing being provided with a sealing 39.

Another fixed plate 40 is secured to the extension 38, while underneath and in front of the concave 2 still another fixed plate 41 is secured. Said plate 41 supports a shaft 42 to which a cover 43 is hinged. Cover plate 44 of said cover 43 is provided with a bent over edge 45 which can cooperate with one or more latches 46 and by which said latches are each connected to said plate 40 via a bolt 47 and a spring 48, which always urges the latches to the latching position. For opening the cover 43 the latches should be turned around bolts 47.

Preferably the lower edges of the plates 34 and 35 are provided with inner flanges to which also sealings 31 are secured and which abut against walls 36 and 37.

Said sidewalls 36,37, guide plates 26,27,38, plates 29,40, 41 and plate 44 of the cover 43 form a closed space.

Underneath plate 41 a sealing 49 is provided, which reaches the grain pan and prevents grains from being lost.

The latching, respectively the unlocking equipment of the guide plate 26 is best shown in FIG. 7 to 12.

This equipment mainly comprises a stud 50 secured to the inner wall of plate 29 of the guide plate 3, on which a lever 51 is pivotingly supported. Said lever 51 is pivotingly connected via spindles 59,53 to rods respectively 54,55, which rods at their other free end, are pivotingly connected to levers respectively 58 and 59 via spindles 56 and 57. Said levers 58 and 59 are each of them pivotingly supported via studs 60 and 61 to the plate 29.

A pin 69 is secured to each lever 58 and 59 which is provided with a conical end 63 which extends through aperture 64 in the respective walls 34-35 and an aperture 65 in the respective walls 36-37, by which said pins 62 are supported via their conical ends 63 in the conical recess 66 of for example bolts 67 which themselves are axially movable with respect to a nut 68 which itself is welded to each of the sidewalls 36-37. In order to fix bolt 67 with respect to nut 68, after said bolt has been adjusted, a check nut 69 is provided.

Said lever 51 is provided with a handle 70, which in turn supports a slat 72 via a spindle 71. Said slat 72 is connected at its other free end to a tension spring 73, which itself is connected at its other free end to a screwed rod 74, which is connected to a support 75 provided on the flange 30 of the guide plate 3. Said tension spring 73, more especially the point 71 and the connection point between the parts 74 and 75, are arranged in such a manner that, in the latched position spring 73 assists the latching.

Figure 8:
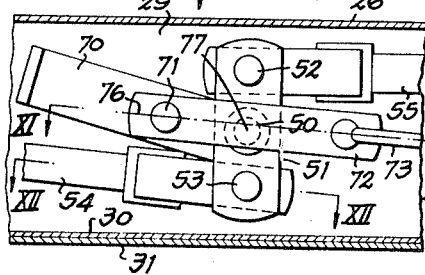
FIG. 8 is a cross-sectional view on a larger scale of the part indicated by F8 in FIG. 7.
Figure 9:
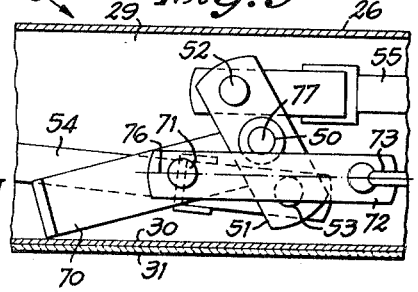
FIG. 9 is a view similar to FIG. 8 but with the subject of the invention in another characteristic position.

Indeed, as it is seen in FIG. 8 the center line 76 of spring 73 is above the center 77 of the stud 50 when the guide plate is latched. This results in the fact that the lever 51 under influence of spring 73 constantly tends to move the rods 54 and 55 away from each other. In other words the pins 62 are constantly urged into the respective recesses 66 so as to support the guide plate in the guiding position.

OPERATION

The use and the function of this mechanism as shown in FIG. 1-2-3 is very simple and as follows:

When starting to thresh, the mechanism is in the position as represented in FIG. 1, in other words guide plate 3 forms a perfect guidance for the crop from elevator 1 towards the threshing mechanism 2,4. In this position, guide plate 3 is supported on the one hand by shaft 6, and on the other hand, by the extensions 13 and 14 of levers 15 and 16.

When a stone or another foreign object is conveyed through the elevator 1, this stone or the like will be flung downwards either by beater 5 or cylinder 4 onto guide plate 3. In response to this impact on the guide plate there will be a certain force via holes 11 and 12 on extension 13–14. When this force is sufficient with respect to the pulling force of the aforesaid springs 21–22, holes 11 and 12 will slide over the extensions 13 and 14. At this moment, guide plate 3 will rotate downwards around shaft 6.

This position is shown in FIG. 2, by which it is obvious that in this position through the cooperation of the guide plate 3 on the one hand and the bent plate 8 on the other hand, a stone trap is formed. It is clear that this stone trap is only formed at the moment that the first stone is supplied, so that up to this moment the threshing mechanism operates with a maximum of output, because there is no discontinuity which obstructs the good supplying of crop.

When the stone trap is formed in this way, one can go on threshing and extension 24 of rod 23 abuts on stop block 25 in order to prevent the guide plate 3 from falling on down.

The aforesaid connection 17, 18, 19 between levers 15 and 16 is applied in order to insure that levers 15 and 16 are displaced at the same moment. Indeed, it can happen that when the levers are not kinematically connected with each other, and a stone interferes with guide plate 3 for example at the side of lever 15, only lever 15 would be displaced by which plate 3 could be deformed and interfere between its guides.

In order to remove the stones or stone, it suffices to turn the aforesaid rod 23 so that extension 24 can pass below the aforesaid stop block 25, and by which guide plate 3 can continue to rotate around shaft 6 up to the moment that the aforesaid flange 7 has passed the lower extreme end of plate 8. At this moment, a clearance is formed through which the stones or stone can fall.

Further, preferably one will bring plate 3, in the position as represented in FIG. 1, by simply rotating this plate upwards via the aforesaid rod 23, up to the moment that the aforesaid extensions 13 and 14 penetrate in the holes 11 and 12 of plate 3.

As a matter of fact, the aforesaid extensions 13 and 14 will be determined in shape and dimension with respect to the weight of the guiding plate and the pressure normally urged on said plate by the crop supplied over said plate 3 on the one hand and the force which is exercised by a relatively small stone on plate 3 when it is flung on this plate via the beater 5 or cylinder 4 on the other hand.

Figure 4:
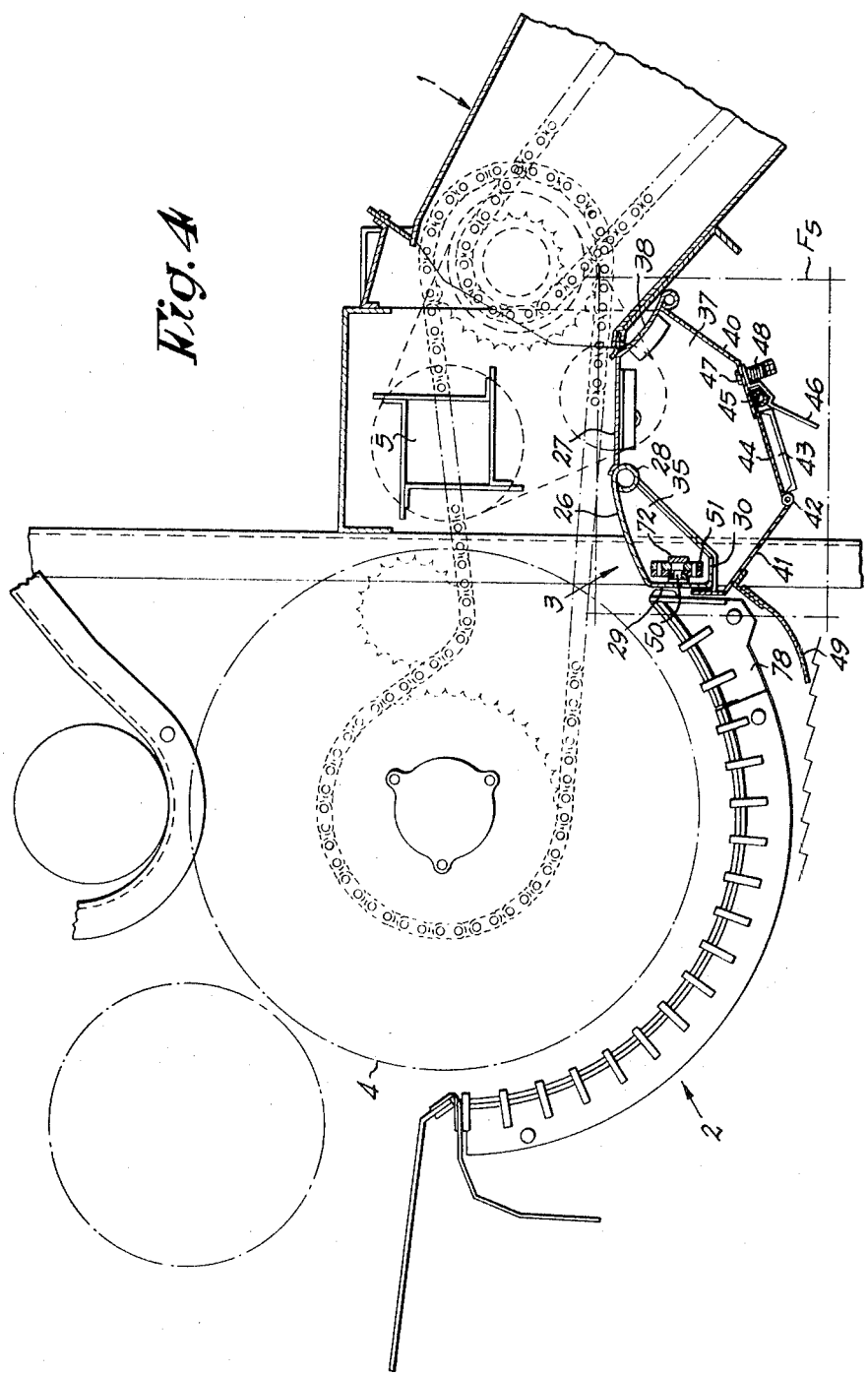
FIG. 4 is a view similar to FIG. 1 but for a modified execution.
Figure 5:
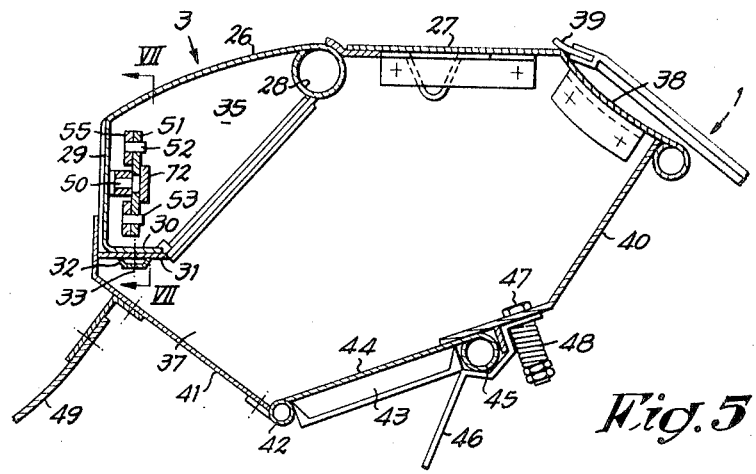
FIG. 5 is a longitudinal sectional view 1 on a larger scale of the part indicated with F5 in FIG. 4.
Figure 6:
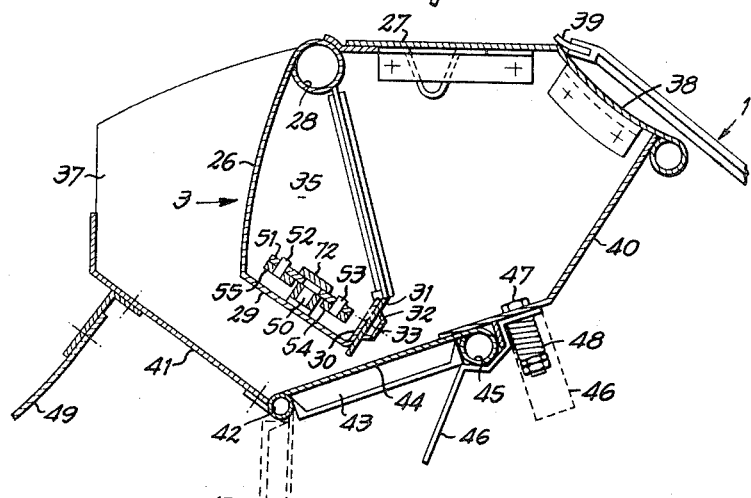
FIG. 6 is a view similar to this of FIG. 5 but with the subject of the invention in another characteristic position.

The use and function of the mechanism as shown in FIG. 4 to 12, which is basically the same as above, is as follows:

The mechanism with the guide plate 3 forms a perfect guidance for the crop when it is in the position as shown in FIG. 4 and 5.

When a stone or the like is fed toward the threshing equipment, said stone or the like will be flung towards or pressed upon the guiding element 3 by the beater 5 or the cylinder 4 by which, independently of where said stone or the like hits surface 26, the construction 26,29,30, 34,35 together with the equipment which ensures the latching, is displaced over a small distance. As a result thereof both pins 62 are displaced simultaneously over an equal distance out of the recesses 66.

Indeed, at the beginning of the downwards movement of the equipment 3, the spring 73 resists against this displacement for a certain extent, which is very advantageous as under normal conditions. The crop also presses on the guide plate 26 while the guide plate 26 should not hinge downwards under this pressure. Said pressing of the crop on the guide plate is considerably less as if there would be supplied a stone.

When, however, said stone is hit on the guide plate 26 then the construction 26,29,30,34,35 will be displaced downwards over such an extent, that by the movement of both pins 62 towards each other, the rods 54 and 55 will urge the lever 51 to turn. This also makes the handle 70 turn over the same angle by which point 71 is displaced downwards with respect to the flange 30, which results in the fact that line 76 reaches below the center 77 at a certain moment. From this moment on spring 73 assists the unlocking of the equipment, while under influence of this spring the pins are completely removed from the recesses 66 by which the guiding plate 3 hinges freely downwards around said shaft 28.

At the moment the guiding plate 3 is completely hinged downwards, see more especially FIG. 5, a stone trap is formed by the plates 40–41 and the cover 43–44. It is thus possible to continue to harvest and thresh at this moment, by which the stones which are supplied to the threshing equipment are automatically gathered in the so formed trap 40,41,43,44.

For cleaning said stone-trap it is sufficient to turn the latches 46 and to open the cover 43. At this moment it is possible to bring the guide plate 3 in its initial position by hinging said plate upwards by hand and to turn handle 70 until the center line of the spring 73 is again positioned above the center 77 and until the pins 62 again cooperate with the holes 66 so that the guide plate 3 is again latched in its guiding position.

The above described both execution of the invention ensure an excellent feeding of the crop towards the threshing mechanism, respectively a maximum output of the combine harvester as there are no obstacles which obstruct the fluent supply of crop to the threshing device. At the same time a perfect protection against damages to the threshing device by stones or the like is ensured as the guide plate 3 will automatically hinge downwards so as to form or the open a stone strap when a stone is supplied so as to trap said stone.

Another advantage is that the total surface of the concave remains unchanged independent from the fact whether there is a stone trap or not.

Another advantage is that, even when said guide plate 3 is hinged downwards, it is still possible to continue to harvest.

Another advantage is that during operation, even after a stone has entered no straw is sticked between certain elements and no clogging can thus occur by this reason.

Still another advantage resides in the fact that at any time a stone is supplied and independent from the location where said stone passes over guiding plate, said guiding plate will positively be unlocked as the supporting means are kinematically interconnected and thus both supporting elements will simultaneously and over equal distances be displaced.

Still another advantage resides in the fact that the so formed stone trap can easily be cleaned from the steering platform if the first execution is applied.

Still another advantage resides in the fact that the latching and supporting means are positively held in their latching position when only crops are supplied to the threshing device and that said latching and supporting means are positively assisted in moving to their unlatched position when a stone is supplied. This advantage is only embodied in the second preferred execution.

MODIFICATIONS

Other features and advantages of the present invention will occur to those skilled in the art, as will many modifications and alterations in the preferred embodiments of the invention described herein, all of which may be achieved without departure from the spirit and scope of the invention.

It will for instance be understood that good results may be obtained with the guiding plate as described above provided at any place in the bottom wall of the straw-elevator, underneath the straw-elevator-chain.

It will further be understood that the mechanism as described with respect to the second preferred embodiment may be provided with similar means as in the first execution for cleaning the stone trap from the steering platform. These means should in this case comprise for instance a control means for controlling the position of the cover plate and a control means by which it is possible to hinge the guide plate upwards and another or combined control means for displacing the supporting pins to their latching position.

I claim:

1. In combination with a crop harvester having crop feeding means and crop threshing means, the combination therewith of hinged guide plate means disposed between the crop feeding means and the crop threshing means, spaced apart releasable support means supporting said guide plate means in an upper guiding position, said support means being responsive to the application of a sudden specific pressure or force upon the guide means to release said guide means to permit it to swing to a lower stone trap position, and means operatively interconnecting said support means causing substantially simultaneous release of said support means upon the application of a sudden specific pressure.

2. The combination set forth in claim 1 in which the support means includes moveable means to each side of the hinged guide plate means, said means operatively interconnecting being link means.

3. The invention set forth in claim 2 in which the link means includes first and second links, one end of each of the links being interconnecting with an associated moveable means and the other end of each of the links being interconnected with each other by pivoted link.

4. In combination with a crop harvester having crop feeding means and crop threshing means, the combination therewith of hinged guide plate means disposed between the crop feeding means and the crop threshing means, pivot means to the rear of the crop feeding means and hingedly supporting the forward end of the guide plate means, a curved guide plate situated to the rear of the hinged guide plate means and having a surface adjacent the hinged guide plate which is equidistant from the center line of the pivot means and releasable support means to support said guide plate means in an upper guiding position, said support means being responsive to the application of a sudden specific pressure or force upon the guide plate means to release said guide plate means to permit it to swing to a lower stone trap position.

5. In combination with a crop harvester having crop feeding means and crop threshing means, the combination therewith of hinged guide plate means disposed between the crop feeding means and the crop threshing means, releasable support means to support said guide means in an upper guiding position, said support means being responsive to the application of a sudden specific pressure or force upon the guide means to release said guide means to permit it to swing to a lower stone trap position and abutment means hold the guide plate means in the lower stone trap position, said abutment means being operable upon manual actuation to swing the guide plate means to a still lower position to permit any stones trapped within the stone trap to be discharged.

6. In combination with a crop harvester having crop feeding means and crop threshing means, the combination therewith of hinged guide plate means disposed between the crop feeding means and the crop threshing means and releasable support means to support said guide means in an upper guiding position, said support means being responsive to the application of a sudden specific pressure or force upon the guide means to release said guide means to permit it to swing to a lower stone trap position, and retaining means disposed below the hinged guide plate means, said retaining means being moveable between a first position wherein it retains stones within the stone trap and a second position which permits the discharge of the stones from the stone trap.

7. The combination as set forth in claim 2 in which said moveable means engaging each side of the hinged plate means are levers hinged at one end on the framework and have resilient means connecting the other end of each lever to the framework for urging the levers into engaging position with respect to said hinged plate means.

8. The combination as set forth in claim 2 in which said link means includes resilient overcenter means to positively hold the moveable means in supporting position when the guide plate means are in operable position and to positively assist releasing of said support means after initial swinging movement to a lower stone trap position, responsive to said sudden specific pressure or force.

9. The combination as set forth in claim 1 wherein said support means are mounted on said guide plate means and engage associated elements on the framework to support said guide means in an upper guiding position, the support means being simultaneously releasable responsive to the application of a sudden specific pressure force upon the guide means to permit the guide means to swing to a lower stone trap position, the support means including moveable means engageable with said elements, and said means operatively interconnecting including a pivoted link and first and second links, one end of each of the first and second links being interconnected with an associated moveable means and the other end of each of the first and second links being interconnected with each other by the pivoted link, said pivoted link being pivoted on said guide plate means.

10. The combination as set forth in claim 1 in which a feeder beater is rotatably provided approximately above said guide plate means and in front of said threshing means for feeding the crop material to said threshing means and for flinging foreign objects upon the guide plate means for applying said sudden specific pressure or force upon said guide plate means.

* * * * *